US006135704A

United States Patent [19]
Seaberg

[11] Patent Number: 6,135,704
[45] Date of Patent: Oct. 24, 2000

[54] LAYER-PICKING CLAMP SUPPORTED ON A FORKLIFT TRUCK

[75] Inventor: Richard D. Seaberg, Brush Prairie, Wash.

[73] Assignee: Cascade Corporation, Fairview, Oreg.

[21] Appl. No.: 08/964,116

[22] Filed: Nov. 4, 1997

[51] Int. Cl.[7] .................... B65G 57/03

[52] U.S. Cl. .................... 414/791.6; 294/119.1; 414/543; 414/619; 414/623; 414/774.6; 414/789.6; 414/789.7; 414/792.6; 414/796.2; 414/802; 414/927

[58] Field of Search .................... 414/619, 623, 414/744.6, 744.7, 792.9, 789.6, 789.7, 796.2, 801, 802, 543, 555, 788.4; 927/929; 294/119.1

[56] References Cited

U.S. PATENT DOCUMENTS

| | | | |
|---|---|---|---|
| 2,924,484 | 2/1960 | Tolsma | 294/87 |
| 3,030,138 | 4/1962 | Bennett | 294/63 |
| 3,262,595 | 7/1966 | Seip, Jr. et al. . | |
| 3,549,192 | 12/1970 | Cassady . | |
| 3,834,555 | 9/1974 | Bennington et al. | 414/744.6 X |
| 3,866,780 | 2/1975 | Miller et al. . | |
| 4,252,496 | 2/1981 | Williams | 414/623 |
| 4,493,599 | 1/1985 | Hartness et al. | 414/796.2 |
| 4,493,604 | 1/1985 | Walker | 414/622 |
| 4,552,501 | 11/1985 | Clark et al. | 414/555 X |
| 4,603,896 | 8/1986 | Vasseur et al. | 294/2 |
| 4,736,971 | 4/1988 | McManus | 294/87.1 |
| 4,850,783 | 7/1989 | Maekawa | 414/792.9 |
| 5,141,274 | 8/1992 | Hayden et al. | 294/2 |
| 5,161,934 | 11/1992 | Richardson | 414/621 |
| 5,253,974 | 10/1993 | Williams | 414/623 |
| 5,338,150 | 8/1994 | Focke et al. | 414/799 |
| 5,516,255 | 5/1996 | Tygard | 414/607 |
| 5,725,346 | 3/1998 | Davina | 414/543 X |

FOREIGN PATENT DOCUMENTS

| | | | |
|---|---|---|---|
| 2147669 | 10/1995 | Canada . | |
| 35 08 194 | 9/1986 | Germany | 414/619 |
| 61-257829 | 11/1986 | Japan | 414/788.4 |

OTHER PUBLICATIONS

Cascade Corporation, Specification Sheet for Brick Layer Clamp (1990).

Tygard Machine & Manufacturing Co., "Tygard Claw," (1994).

*Primary Examiner*—Janice L. Krizek
*Attorney, Agent, or Firm*—Chernoff, Vilhauer, McClung & Stenzel

[57] ABSTRACT

A layer-picking clamp mountable on a truck has clamp arms extending downwardly from and movably mounted to an upper frame section. The clamp arms are linearly movable with respect to the upper frame section in laterally inward and outward directions so that gripping surfaces of the clamp arms retain their substantially vertical orientations as the clamp arms move inward and outward. The upper frame is supported on a first mounting apparatus that is positioned above a second mounting apparatus that supports a load-supporting device. The first mounting apparatus movably supports the upper frame so as to move the upper frame laterally and vertically with respect to the load-supporting device to enable the clamp arms to deposit a load on the load-supporting device. The load-supporting device is capable of supporting a pallet upon which the clamp can deposit the load. The clamp is supported on a laterally extending telescopically extendable and retractable boom pivotally mounted on the truck so as to pivot laterally with respect thereto. The clamp is vertically movable and laterally extendable and retractable by the boom along multiple lateral directions at least in a 180° range relative to the truck.

18 Claims, 9 Drawing Sheets

LAYER-PICKING CLAMP SUPPORTED ON A FORKLIFT TRUCK

BACKGROUND OF THE INVENTION

The present invention relates to a layer-picking clamp supported on a truck for gripping at least one layer of items which form part of a layered load.

Warehouses commonly contain narrowly spaced rows of shelving designed to hold pallets of stacked goods, usually composed of stacked layers of cartons containing like items. Forklift trucks raise and lower entire pallets to and from the shelving. However, in certain cases only one or two layers from a particular pallet is needed, not the entire palletized load, particularly when preparing a palletized load of mixed layers of different items for shipment. Williams U.S. Pat. No. 4,252,496, Vasseur et al. U.S. Pat. No. 4,603,896, Richardson U.S. Pat. No. 5,161,934, Williams U.S. Pat. No. 5,253,974, and Tygard U.S. Pat. No. 5,516,255 are directed to clamping devices that may be used to grip a layer of items. These clamping devices are generally mounted on or incorporated with forklift trucks from which the forks have been removed.

Generally, to use the traditional devices, the forklift operator must first position the clamping portion above a layered pallet. Correct positioning requires skillful forklift maneuvering since the clamping portion can usually be positioned solely through correct positioning of the forklift. Once in the correct position, the clamping portion grips one or more layers of items. Then, the forklift can be used to raise the layer and carry it to a receiving pallet upon which the layer is deposited. By repeating this procedure, the operator collects different layers from different randomly located pallets and builds a load of mixed layers on the receiving pallet.

The Tygard device disclosed in U.S. Pat. No. 5,516,255 reduces the time wasted in positioning the forklift by allowing a side-mounted clamping device to shift sideways from a position close to the truck to a position further from the truck. Further, Tygard discloses that the design could be modified so that the side-mounted clamping portion, while to one side of the truck, could also be adjusted in the fore and aft direction of the truck. This limited motion allows an operator to compensate for misalignment of the truck without having to reposition the entire truck. The Tygard device, however, does not eliminate the time-consuming need to drive and reposition the truck between the place where a layer is picked up and the place where it is deposited on the receiving pallet.

Focke et al. U.S. Pat. No. 5,338,150 sets forth a stationary device that creates layers on a pallet by gripping one or two cartons and removing them from a conveyor, pivoting to a pallet, and arranging the cartons on the pallet. The gripper end of an articulated laterally swingable boom can pivot in a 180° range for left or right-hand operation. However, this device has no mobility to enable it to collect layers from different random locations, and it is limited to gripping one or two cartons, not layers.

The foregoing devices use downwardly pivoting arms to grip the layer, which enable the gripping surfaces to engage the vertical sides of the layer in parallel relation thereto only in the case of a single set of horizontal layer dimensions. Other dimensions prevent such parallelism, and therefore prevent the gripping surfaces from imposing clamping force over the entire gripping surface, creating damaging force concentrations and poor gripping.

What is needed, then, is a layer-picking clamp that is integral with or mountable on a truck. Together, the clamp and truck should be versatile enough to reduce the need for time-consuming forklift driving and maneuvering. Layers of different horizontal dimensions should be engageable with equal effect.

SUMMARY OF THE INVENTION

The present invention is a layer-picking clamp assembly that is integral with or mountable on a truck of any suitable type. Together, the clamp assembly and truck are versatile enough to reduce the need for time-consuming driving and maneuvering.

According to one aspect of the invention, a layer-picking clamp is supported on a first mounting apparatus that is positioned above a second mounting apparatus that supports a load-supporting device. The first mounting apparatus movably supports the clamp so as to move the clamp laterally and vertically with respect to the load-supporting device to enable the clamp to deposit a load layer directly above the load-supporting device. The load-supporting device is preferably capable of supporting a pallet upon which the clamp can deposit the load.

According to another separate aspect of the invention, the layer-picking clamp has at least four clamp arms with respective substantially vertical gripping surfaces extending downwardly from and movably mounted to an upper frame section. The clamp arms are linearly movable with respect to the upper frame section in laterally inward and outward directions so that the gripping surfaces retain their substantially vertical orientations as the clamp arms move inward and outward.

According to a further separate aspect of the invention, the clamp is supported on a laterally extending telescopically extendable and retractable boom pivotally mounted on the truck so as to pivot laterally with respect thereto. The clamp is vertically movable and laterally extendable and retractable by the boom along multiple lateral directions at least in a 180° range relative to the truck. One or more pivot-stopping devices may optionally be included that automatically stop lateral pivotal movement of the boom at predetermined positions within the 180° range.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
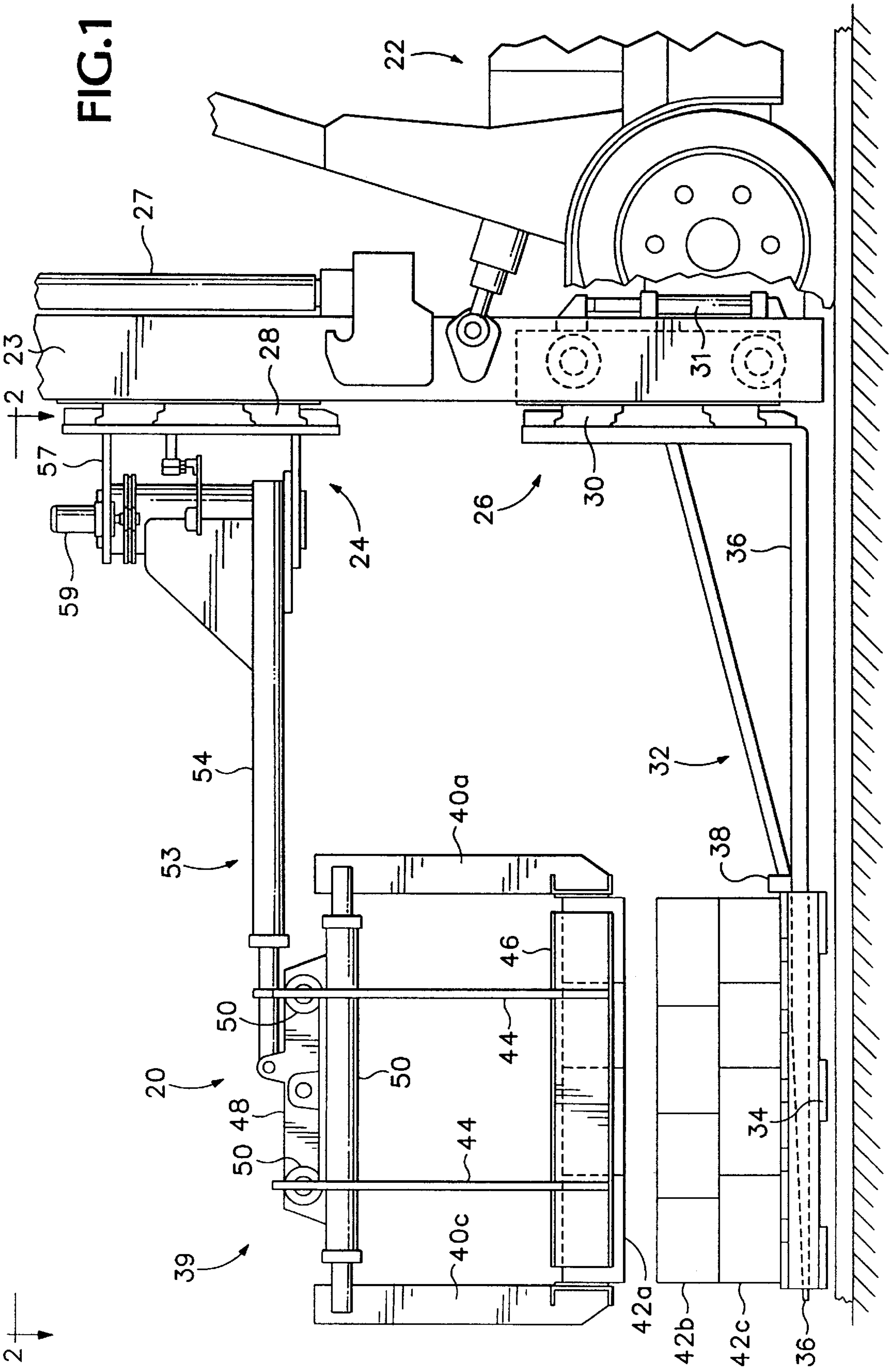
FIG. 1 is a side view of an exemplary embodiment of a layer-picking clamp assembly supported by a truck in accordance with the present invention.

An exemplary embodiment of the present invention includes a layer-picking clamp assembly 20 supported by a truck 22 as shown in FIG. 1. It should be noted that the truck 22 could be, for example, an operator-driven forklift truck, a mechanically guided truck, an electrically guided truck, or a truck on a track system. The clamp assembly 20 includes a telescopic lifting mast 23 having separate first and second mounting apparatus 24, 26, respectively. As shown, the first and second mounting apparatus 24, 26 preferably include independently raisable and lowerable carriages 28, 30. A hydraulic lift cylinder 27 independently raises and lowers the upper carriage 28 along an upper, telescopic portion of the mast 23, while a shorter pair of lift cylinders such as 31 raise and lower the lower carriage 30 along a lower, fixed portion of the mast. Alternately, carriages 28, 30 may be inter-connected so as to be raisable and lowerable in unison while also being selectively movable vertically with respect to each other. In another alternative arrangement, carriage 30 may be stationary.

The second or lower mounting apparatus 26 preferably includes an independently raisable and lowerable lower carriage 30 that supports a load-supporting device 32 designed to hold a pallet 34. As shown, the load-supporting device 32 is a pair of elongated forks 36 with a stop 38 designed to hold the pallet 34 at a predefined distance in front of the truck 22. Alternatively, the load-supporting device 32 could be one or more platens designed to support slipsheet-type pallets. By supporting a pallet 34 on the second mounting apparatus 26 the clamping assembly 20 can be used, as will be discussed below, to place layers on the pallet 34 or remove layers from the pallet 34. This is particularly easy because the pallet 34 is positioned at a known distance from the truck 22 by the load-supporting device 32, and therefore the clamping assembly 20 can pick up or deposit a layer without significant effort expended on positioning.

Figure 2:
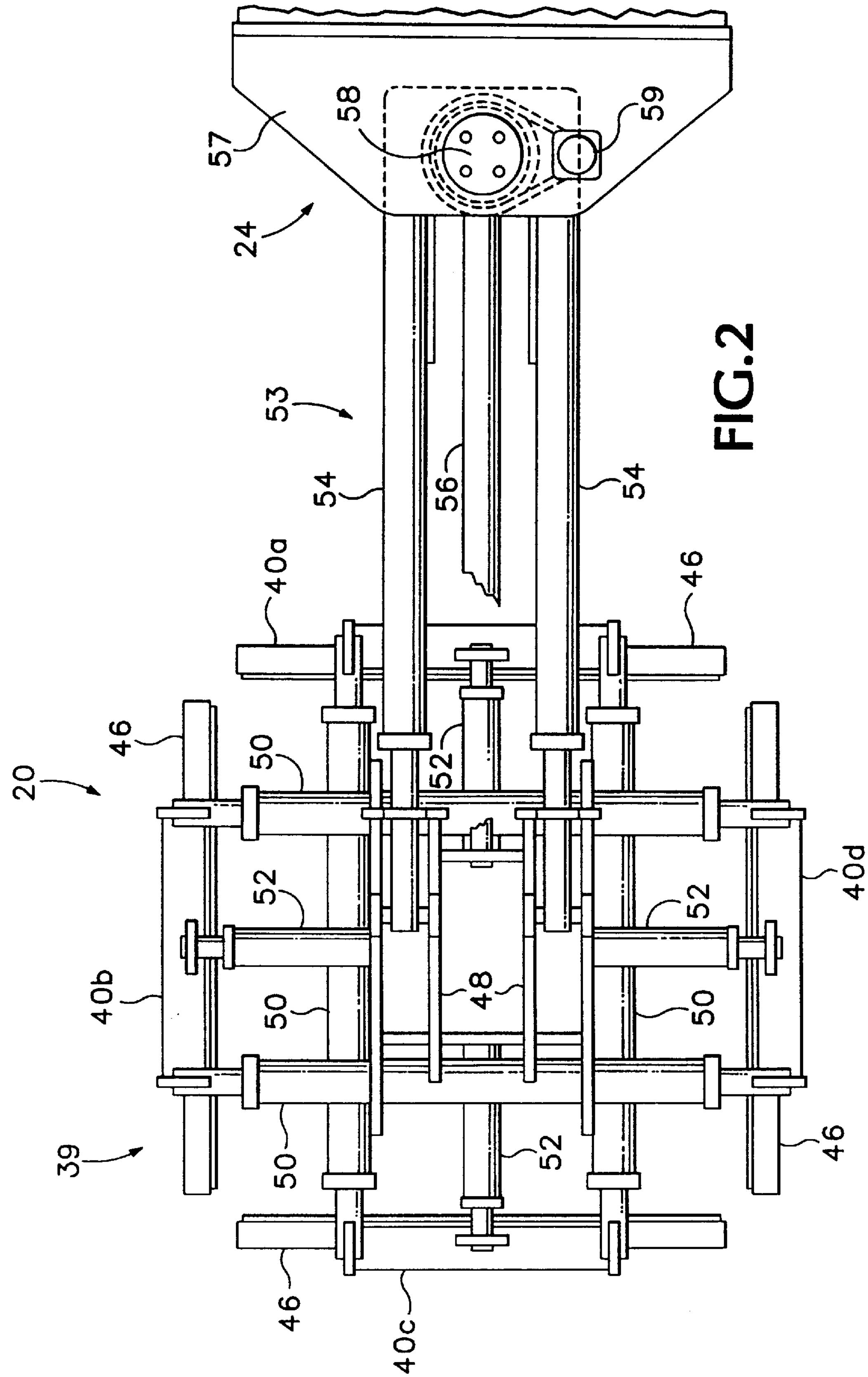
FIG. 2 is a top plan view of the clamp assembly taken along line 2—2 of FIG. 1.
Figure 3:
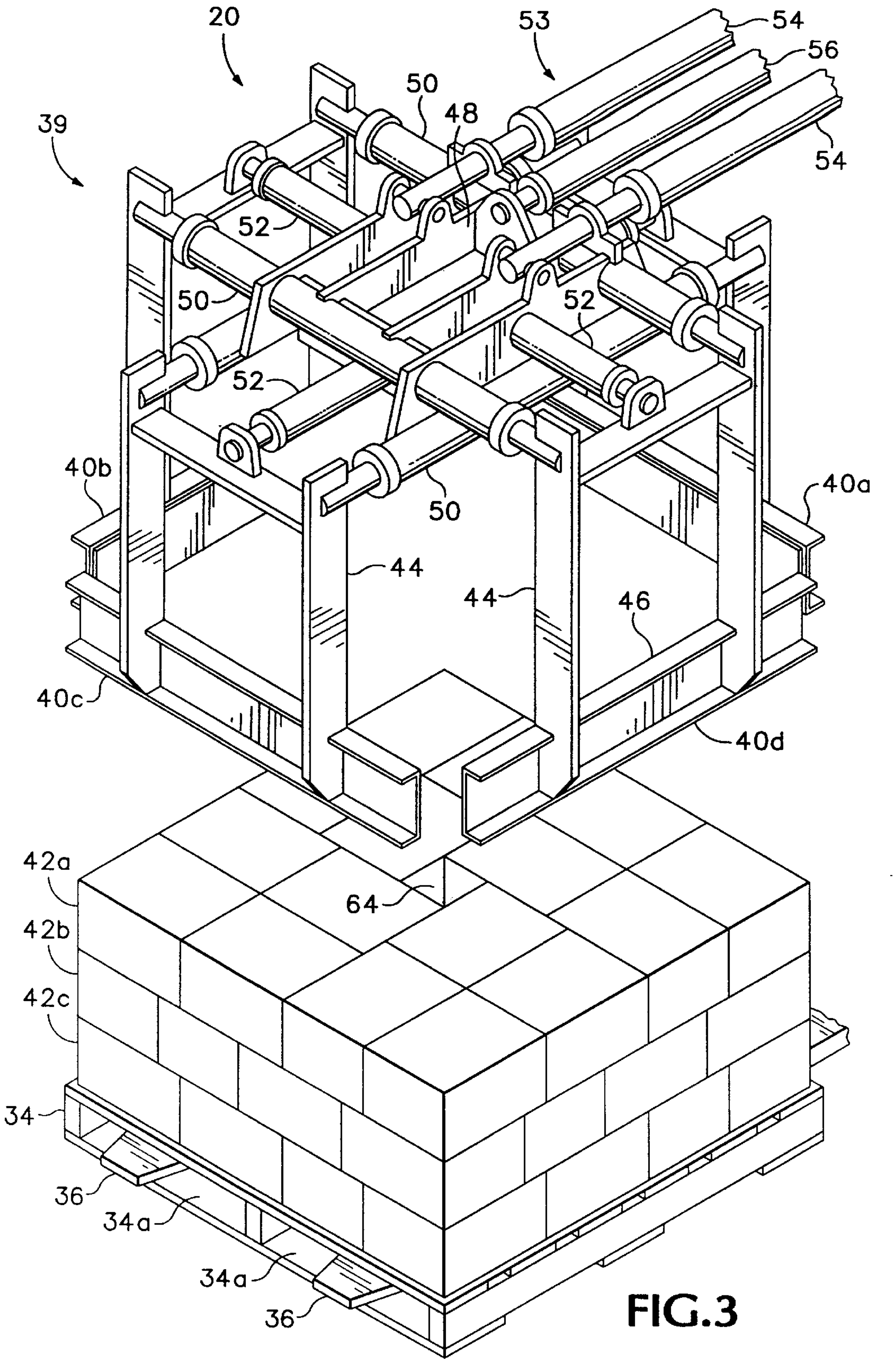
FIG. 3 is a perspective view of the layer-picking clamp assembly above a pallet with a plurality of layers.

As shown in FIGS. 1–3, a clamp 39 preferably has four arms 40*a–d* that extend downward forming a substantially rectangular opening to grip at least one load layer such as 42*a*, 42*b*, or 42*c*. Each of the four arms 40*a–d* has a pair of downwardly extending members 44 and a perpendicularly attached gripping member 46 that is attached toward the bottom of the downwardly extending members 44. The four arms 40*a–d* are movably mounted to an upper frame section 48 by supporting slide guides 50, and slidably movable along the guides by hydraulic cylinders 52. Guided by the slide guides 50, the cylinders 52 push the arms 40*a–d* outward to extend beyond the sides of a layer such as 40*a* and pull the arms 40*a–d* inward to grip the layer. The arms 40*a–d* remain vertical as they move outward and inward. This insures parallelism of the gripping surfaces of the members 46 relative to the sides or the layer, regardless of the layer's horizontal dimensions. It also allows the arms 40*a–d* to be inserted between closely spaced pallets. It should be noted that clamps that have pivoting arms or other types of clamping apparatus could be used in some embodiments of the present invention in place of the sliding arms if the advantages of the sliding arms were unimportant to the particular application.

Preferably, the clamp 39 is telescopically extendable and retractable in relation to the truck 22. The shown embodiment of the clamp 39 is mounted on a boom 53 having at least one elongated slide guide 54 and at least one elongated hydraulic cylinder 56 mounted to a boom support 57 for extension and retraction. Guided by the elongated slide guides 54, the cylinder 56 pushes the clamp 39 outward for extension and pulls the clamp 39 inward for retraction. The outward extremity of extension preferably positions the rearward gripping surface of the clamp 39 outward of the forward tips of the forks 36 so that the clamp can place the pallet 34 on the ground in front of the tips, enabling the tips to be inserted into the pallet by driving the truck 22 toward the pallet. The inward extremity of retraction constitutes an automatic stopping device that automatically positions the rearward gripping surface of the clamp 39 substantially coincident with the front of the stop 38 on the forks 36 to automatically align the clamp in a fore and aft direction relative to the pallet 34 for picking up or depositing load layers.

Figure 4A:
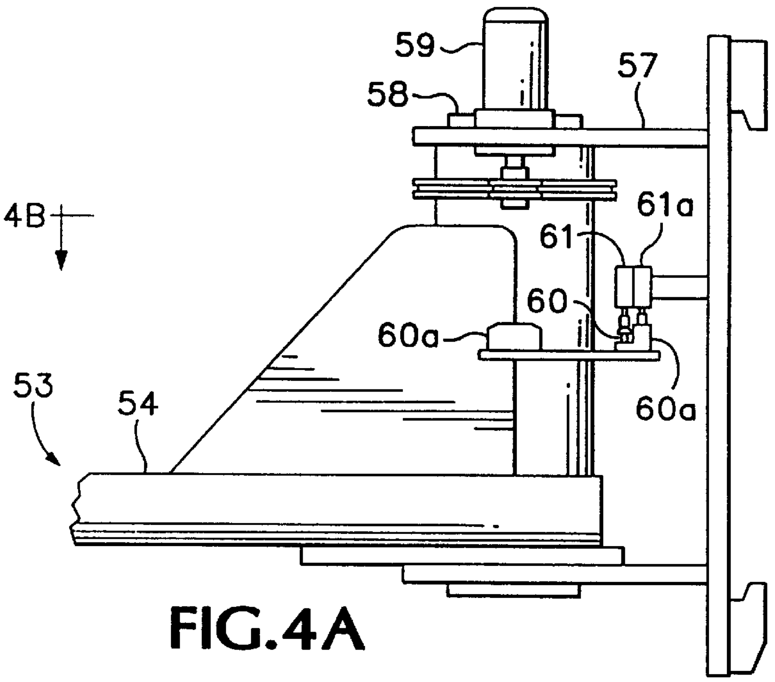
FIG. 4A is an enlarged side view of the pivot on the upper mounting apparatus of the clamp assembly in a front-facing orientation.
Figure 4B:
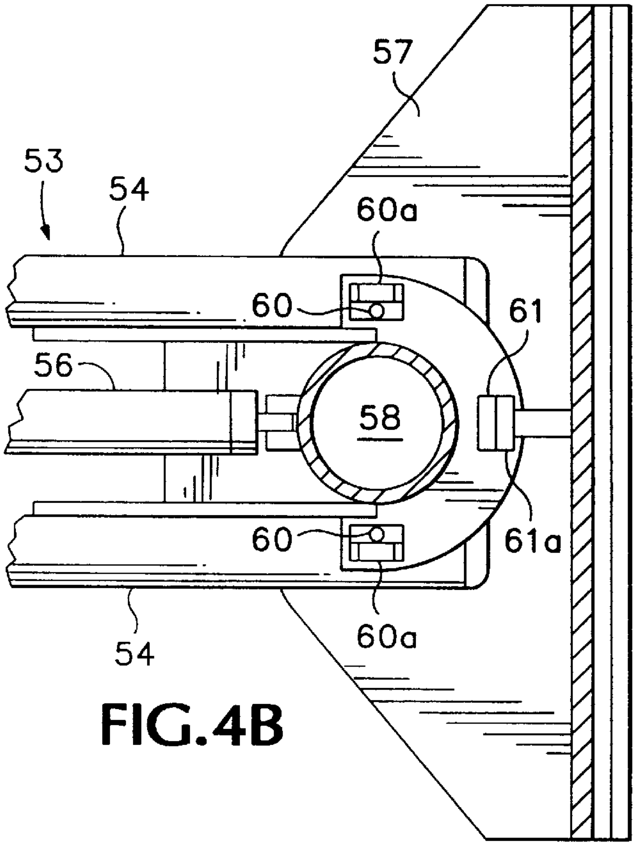
FIG. 4B is a cross section of the pivot taken along line 4B—4B of FIG. 4A.
Figure 4C:
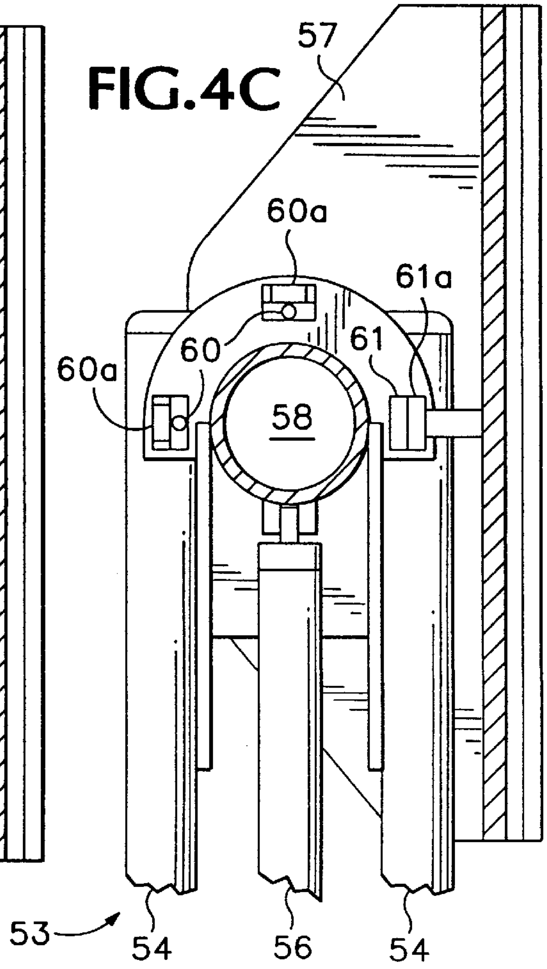
FIG. 4C is the same cross section as FIG. 4B but with the pivot in a side-facing orientation.

As shown in FIGS. 4A–4C, preferably the boom 53 of the clamp assembly 20 is pivotally mounted in relation to the boom support 57. The shown embodiment of the clamp assembly 20 includes a pivot 58 that pivotally attaches the elongated slide guides 54 and hydraulic cylinder 56 to the boom support 57. Although the clamp assembly 20 and boom 53, as shown, pivot in a 180° range under the manual control of a hydraulic motor 59, automatic pivot-stopping devices 60 may optionally be included to automatically stop the pivoting of the clamp assembly 20 at a front position (FIG. 4B) relative to the truck 22, at a left position (FIG. 4C), and at a right position (not shown). Preferably, the right and left positions are at 90° angles to the front pivot position. The front pivot position automatically aligns the clamp 39 laterally with the pallet 34 for picking up or depositing load layers. The pivot-stopping devices 60 accomplish the automatic stop function by proximity or contact activation of an electrical switch 61 which causes a solenoid valve (not shown) to block flow through the motor 59 at a stop position. Deceleration devices 60*a* may also optionally be included to activate a switch 61*a* which causes another solenoid valve (not shown) to restrict flow through the motor 59 just prior to stopping.

Alternatively, pivoting of the boom 53 could be accomplished in an entirely different way by a linkage powered by one or more hydraulic cylinders, with automatic stop positions determined by the geometry of the linkage.

Using the combination of the telescopic and pivotal features of the boom, the clamp 39 is extendable and retractable along multiple directions in a 180° range. Accordingly, the clamp is telescopically extendable and retractable to the right, front, and left sides of the truck 22.

The gripping by the clamp 39, the raising and lowering of the mounting apparatus 24 and 26, the pivoting of the boom 53, and the telescoping of the boom 53 in relation to the truck 22 are preferably controlled by the operator of the truck 22 using standard means such as manually operated hydraulic valves or other mechanical or electrical connections.

Using the features discussed above, the clamp assembly 20, when mounted to the truck 22, is extremely versatile. It allows the truck 22 to drive down a narrow warehouse row and accomplish tasks such as picking up a pallet 34, positioning the pallet for insertion of the forks 36 of the load-supporting device 32, picking up different individual layers from randomly located pallets on the right and left sides of the truck 22, placing such layers on the pallet 34 supported by the load-supporting device 32, and placing the fully loaded pallet 34, with its mixture of different individual layers, where it can be picked up by a standard forklift truck for further handling. Alternatively, the clamp assembly 20 can remove different layers from a pallet 34 supported by the load-supporting device 32, and deposit such layers individually on different pallets to the right and left sides of the truck 22.

Figure 5A:
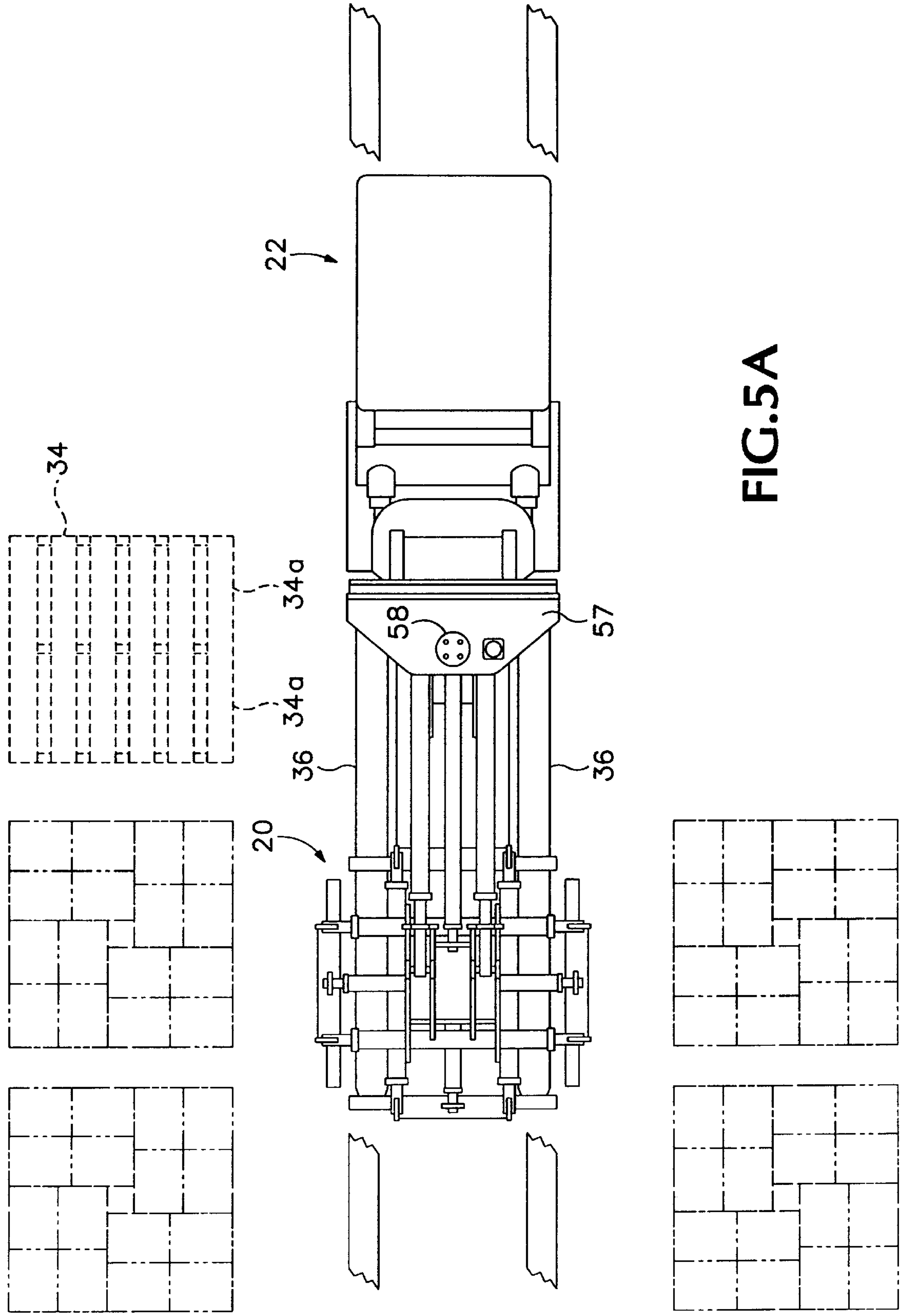
FIGS. 5A–5E are sequential plan views of the clamp assembly in use.
Figure 5B:
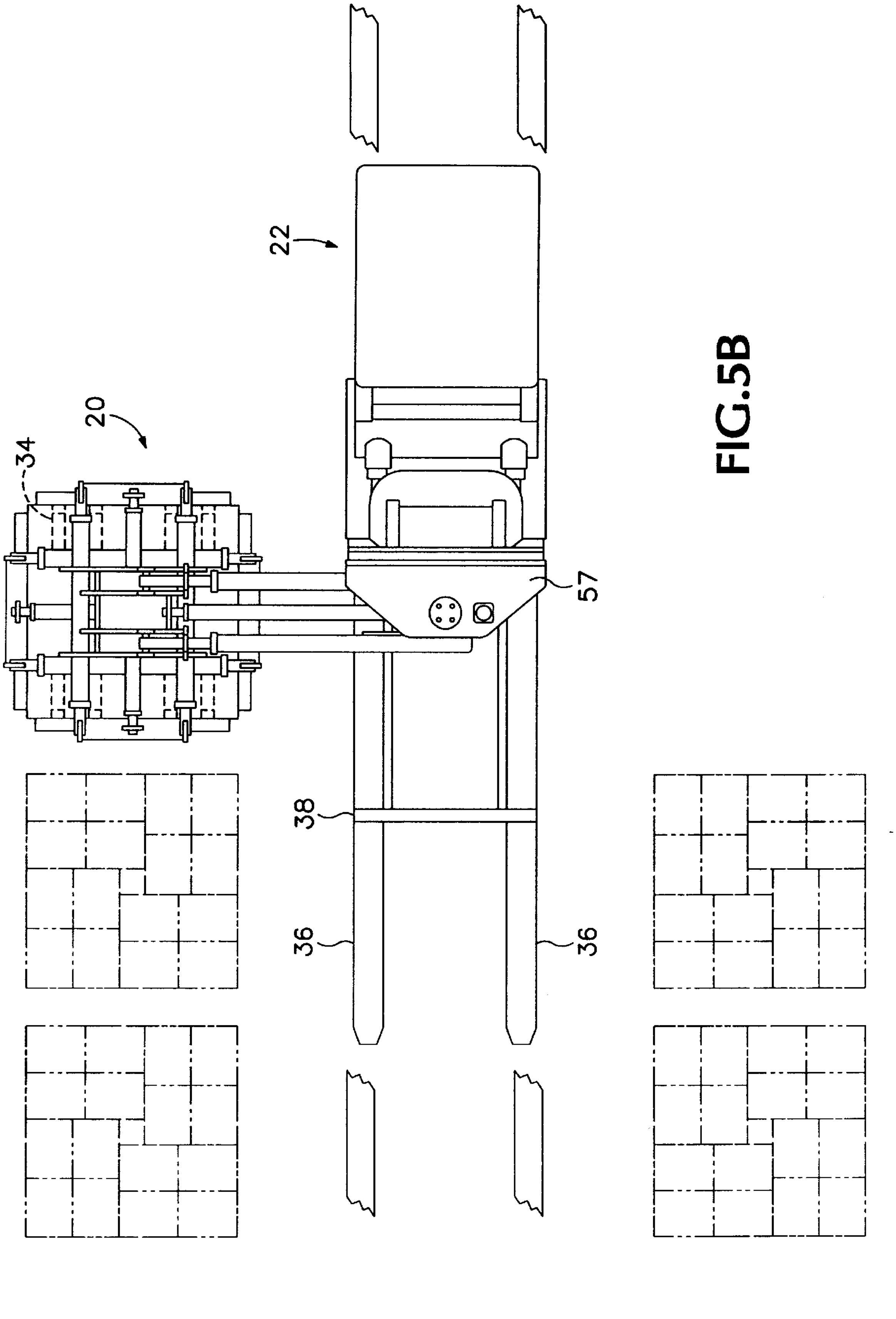
Figure 5C:
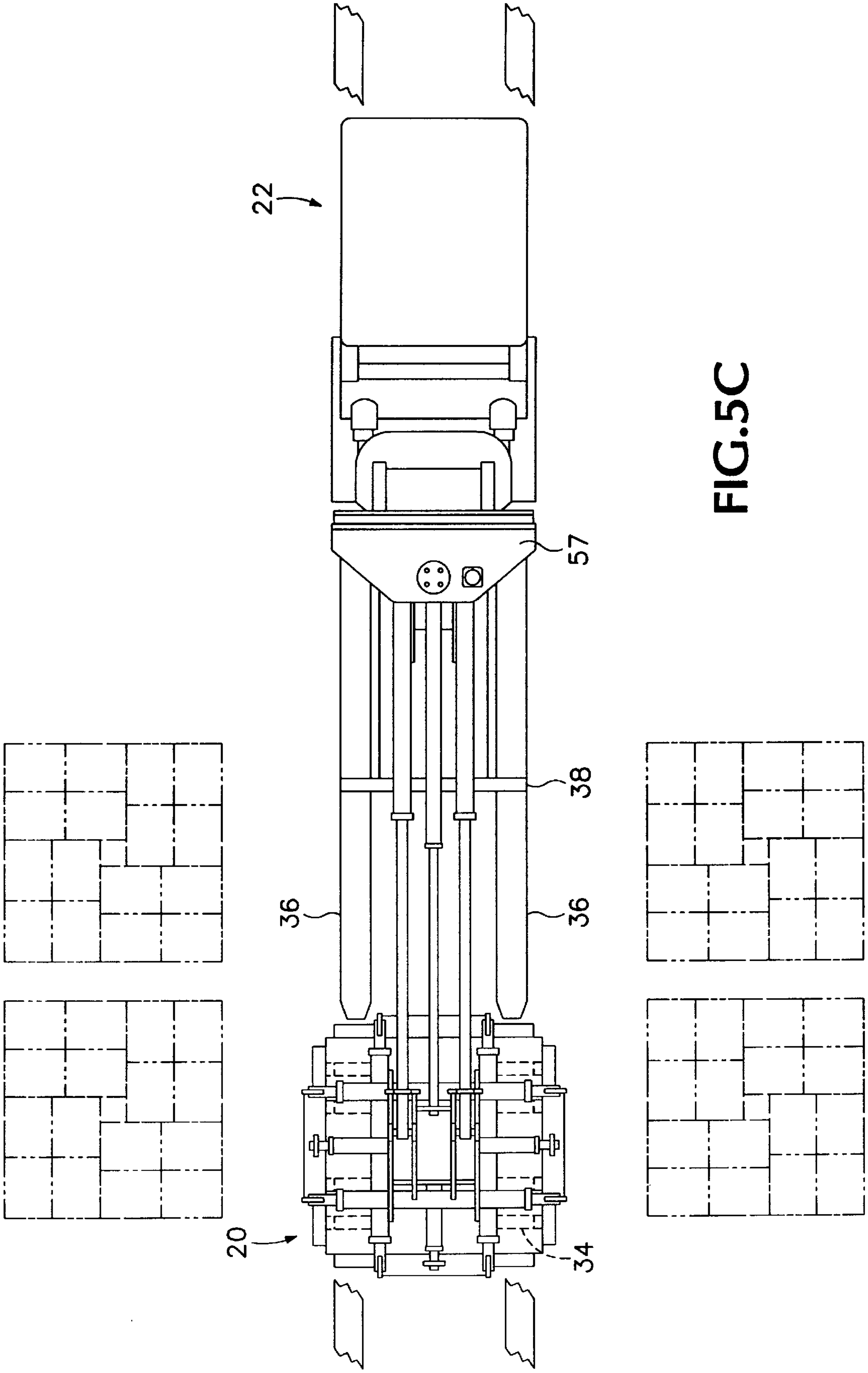
Figure 5D:
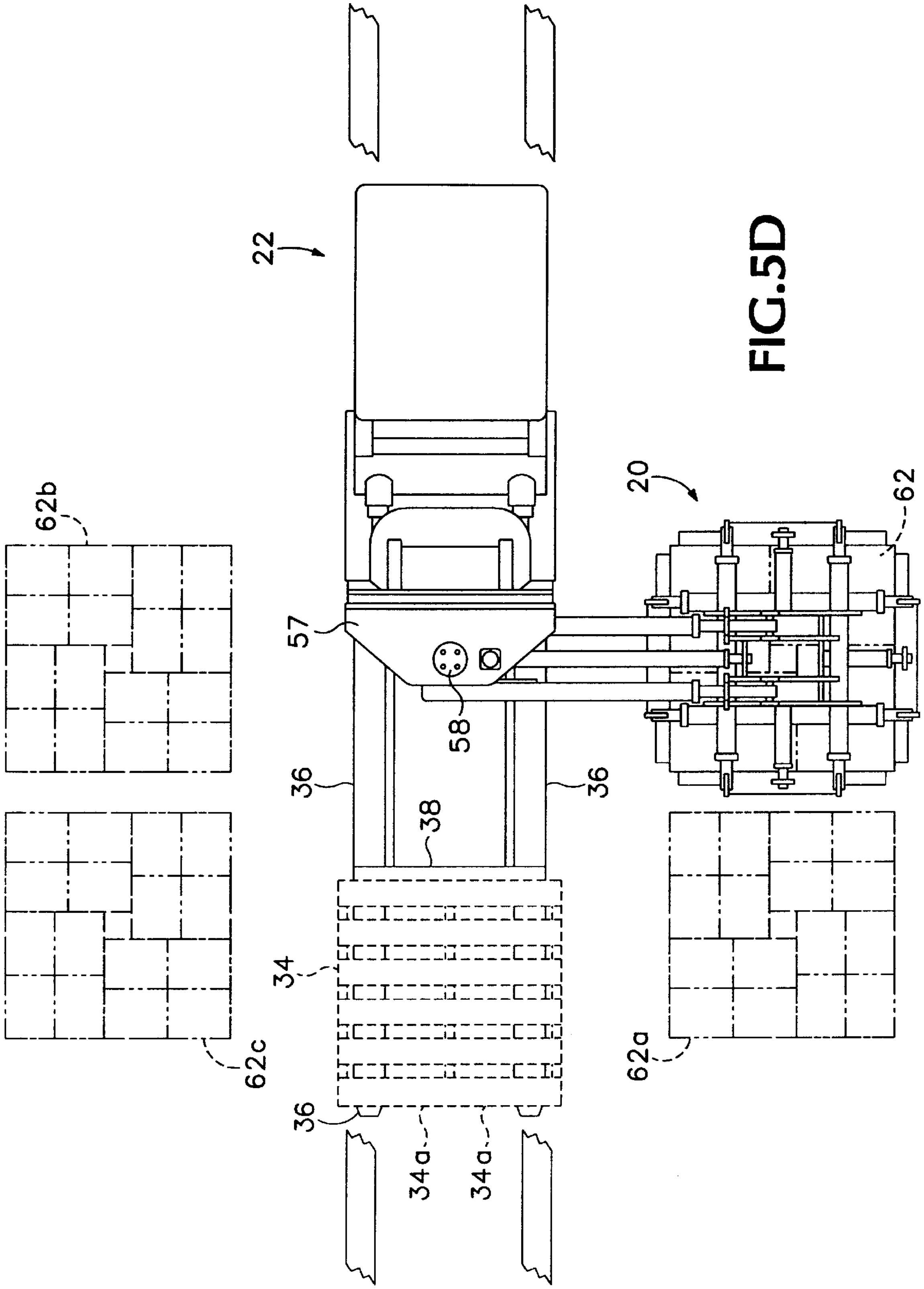

FIGS. 5A–5D show the sequence of a method for using the movable clamp assembly 20 to put a receiving pallet 34 on the forks 36 of the load-supporting device 32. (Although the pallet 34 is initially to one side of the truck 22, it could alternatively be forward of the truck.) First, as shown in FIG. 5A, the truck 22 is positioned alongside the pallet 34 with the pivot 58 aligned with the center of the pallet 34. Then, as shown in FIG. 5B, the clamp 39 is pivoted over the pallet. The pallet 34 is engaged by first moving the arms 40*a–d* outward, lowering the clamp to the lower edge of the pallet 34, moving the arms 40*a–d* inward and raising the clamp. Then, as shown in FIG. 5C, the clamp is pivoted toward the front of the truck 22, telescopically extended, and lowered. The pallet 34 is then deposited on the ground just beyond the tips of the forks 36 with its slots 34*a* aligned with the forks 36. With the forks 36 slightly above the ground, they are inserted into the pallet by driving the truck 22 forward as shown in FIG. 5D until the pallet contacts the stop 38. The forks are then raised by the cylinders such as 31 to support the pallet 34 by lifting it off of the ground.

Figure 5E:
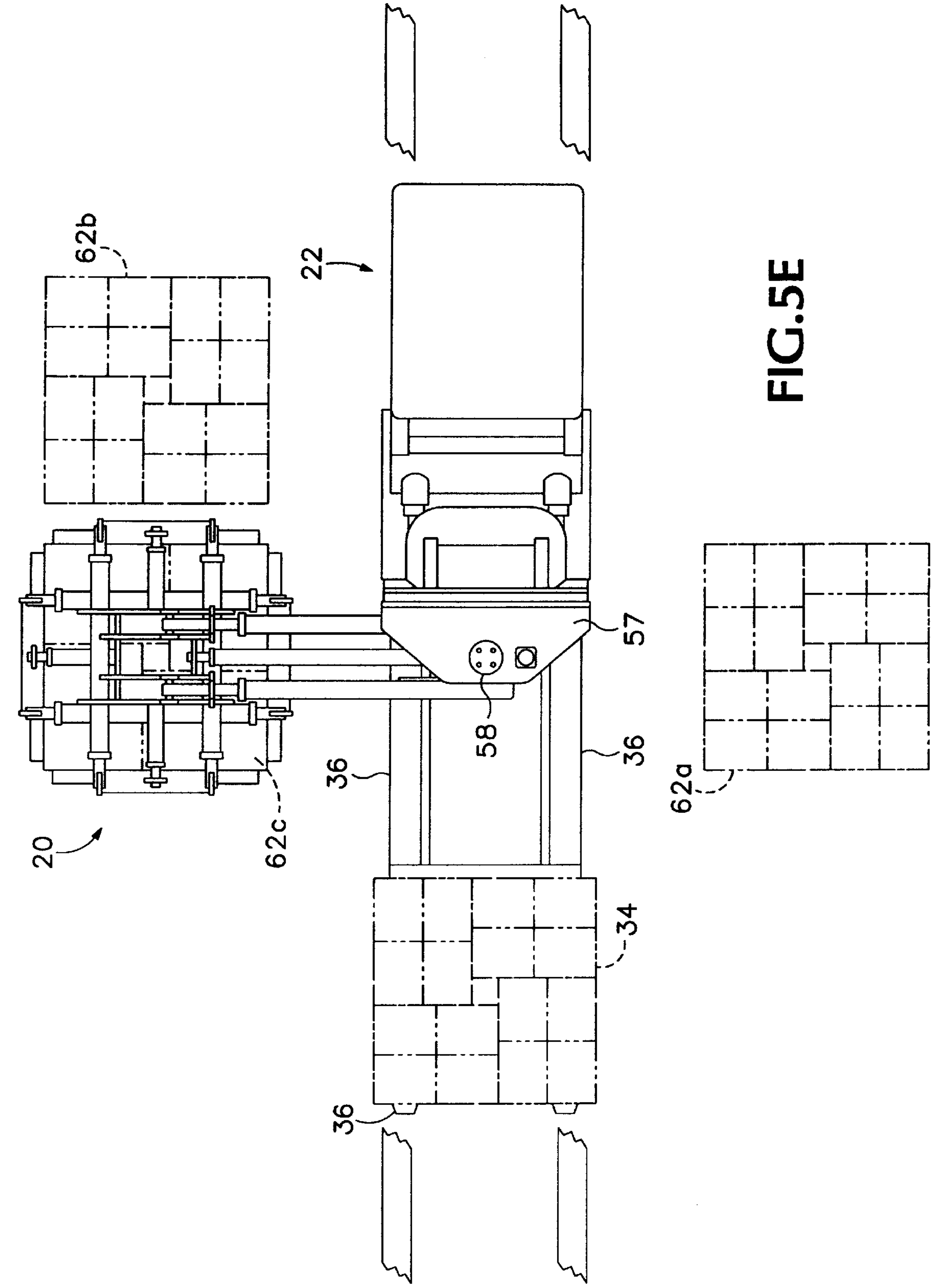

FIGS. 5D and 5E show a method of building a layered pallet load on the receiving pallet 34 supported by the forks 36. First, the truck 22 is positioned adjacent a first supply pallet 62 with layers thereon, the truck preferably being positioned so that the pivot 58 is aligned with the center of the pallet 62. The clamp 39 is then raised to clear the layers on the pallet 62, pivoted toward the pallet, and telescopically adjusted over the layers on the pallet 62 if necessary for proper alignment. The arms 40*a–d* are then moved outward, and the clamp is lowered to a level for gripping with the bottoms of the gripping members 46 of the arms 40*a–d* substantially even with the bottom of the desired layer or layers. Next, the arms of the clamp are moved inward to grip the layer or layers, and the clamp is raised to clear any layers already on the pallet 34. The clamp is then pivoted forwardly and, if necessary, telescopically adjusted to position the clamp over the pallet 34. The clamp is then lowered until the layer or layers rest atop the pallet or any layers already on the pallet, and the clamp arms are released. Additional layers from other randomly positioned supply pallets 62*a*, 62*b*, or 62*c* may be picked up and deposited by repeating the steps set forth above, moving the truck and pallet 34 in unison as needed to reach the other supply pallets on either side of the truck.

The invention described above may also be used in a method of picking layers from one side of the truck 22 and building a layered pallet on the other side of the truck 22. However, since the receiving pallet would not be carried by the forks 36 in such case, more time-consuming maneuvering of the truck 22 would be required to travel between the receiving pallet and the various supply pallets.

The present invention may also be used to unload a layered pallet supported on the forks 36 by reversing the foregoing steps.

The clamp 39 may include a downwardly depending central core member (not shown) if desired. The core member would enter a hole or gap 64 (FIG. 3) that extends through each of the layers on a pallet, and would help keep the items in the layer correctly positioned by resisting the inward clamping force imposed by the clamp.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A layer-picking clamp assembly supported by a truck, comprising:

(a) a horizontally extending, hydraulically actuated, telescopically extendable and retractable boom pivotally mounted on said trucks so as to pivot horizontally with respect thereto;

(b) a clamp, having opposed, downwardly depending clamps arms supported by said boom and capable of separately picking up and depositing individual layers of layered loads;

(c) said clamp being vertically movable and horizontally extendable and retractable telescopically by said boom along multiple pivotal lateral directions at least in a 180° range relative to said truck, said clamp also being movable by movement of said truck;

(d) a right automatic pivot-stopping device that automatically stops lateral pivotal movement of said boom at a right position relative to said truck;

(e) a front automatic pivot-stopping device that automatically stops lateral pivotal movement of said boom at a front position relative to said truck;

(f) a left automatic pivot-stopping device that automatically stops lateral pivotal movement of said boom at a left position relative to said truck;

(g) wherein said right and left pivot-stopping devices are at 90° angles to said front pivot-stopping device.

2. A layer-picking vehicle comprising:

(a) a truck; and (b) a layer picking assembly, including:

(i) a clamp having an upper frame section;

(ii) at least four clamp arms having respective substantially vertically oriented gripping surfaces extending downwardly from and movably mounted to said upper frame section;

(iii) said clamp arms being linearly movable with respect to said upper frame section in horizontally inward and outward directions so that said gripping surfaces retain substantially vertical orientations as said clamp arms move inward and outward;

(iv) each of said clamp arms being movably mounted to said upper frame section by at least one linear slide guide, and being moveable linearly inward and outward by at least one hydraulic cylinder oriented parallel to said slide guide.

3. The clamp of claim 2 wherein each of said arms has a pair of downwardly extending members and a perpendicularly attached gripping member that is attached to said downwardly extending members, said gripping member including a respective one of said gripping surfaces.

4. A method of using a layer-picking clamp supported by a truck to build a layered load, said method comprising the steps of:

(a) inserting a load-supporting device, which is mounted on said truck, beneath a pallet by moving said load-supporting device insertably toward said pallet;

(b) using said clamp, picking up at least one layer from a layered load and thereby separating said one layer from another layer of said layered load;

(c) moving said clamp so that it is above said pallet;

(d) using said clamp, depositing said one layer on said pallet while said load-supporting device is beneath said pallet.

5. The method of claim 4, further comprising using said clamp to pick up at least one further layer from a different layered load, and depositing said further layer upon said one layer while said one layer is on said pallet.

6. A method of using a layer-picking clamp supported by a truck having a front to position a pallet on a pallet-supporting device of said truck, said method comprising the steps of:

(a) using said clamp, picking up said pallet;

(b) depositing said pallet in front of said pallet-supporting device; and (c) inserting said pallet-supporting device into said pallet by moving said pallet-supporting device toward said pallet.

7. The method of claim 6, wherein said step of picking up said pallet further comprises the steps of:

(a) moving said clamp over said pallet;

(b) lowering said clamp to an outer perimeter of said pallet;

(c) gripping said perimeter of said pallet with said clamp.

8. A method of using a layer-picking clamp supported by a pivotal boom on a truck to build a layered load on a receiving pallet, said method comprising the steps of:

(a) inserting a load-supporting device, which is mounted on said truck, beneath said receiving pallet and lifting said receiving pallet by means of said load-supporting device;

(b) thereafter moving said truck, with said receiving pallet, substantially adjacent to a first supply pallet with a layered load thereon;

(c) pivoting said boom to move said clamp over said first supply pallet;

(d) gripping at least one layer of said layered load on said first supply pallet with said clamp, and thereby separating said one layer from another layer of said layered load;

(e) pivoting said boom to move said clamp over said receiving pallet; and (f) depositing said one layer on said receiving pallet with said clamp while said load-supporting device is beneath said pallet.

9. The method of claim 8, including repeating steps (b) through (f) with respect to a second supply pallet with a layered load thereon.

10. A method of using a layer-picking clamp supported by a truck to build a layered load, said method comprising the steps of:

(a) inserting a load-supporting device, which is mounted on said truck, beneath a pallet and lifting said pallet by means of said load-supporting device;

(b) thereafter moving said truck, with said pallet, substantially adjacent to a layered load and, using said clamp, picking up at least one layer from said layered load and thereby separating said one layer from another layer of said layered load;

(c) moving said clamp so that it is above said pallet;

(d) using said clamp, depositing said one layer on said pallet while said load-supporting device is beneath said pallet.

11. The method of claim 10, further comprising using said clamp to pick up at least one further layer from a different layered load, and depositing said further layer upon said one layer while said one layer is on said pallet.

12. A layer-picking clamp assembly supported by a truck, comprising:

(a) a horizontally extending, hydraulically actuated, telescopically extendable and retractable boom pivotally mounted on said truck so as to pivot horizontally with respect thereto;

(b) a clamp, having opposed, downwardly depending clamp arms supported by said boom and capable of separately picking up and depositing individual layers of layered loads;

(c) said clamp being vertically movable and horizontally extendable and retractable telescopically by said boom along multiple pivotal lateral directions at least in a 180° range relative to said truck, said clamp also being movable by movement of said truck;

(d) a load-supporting device mounted on said truck and capable of supporting a pallet upon which said clamp can deposit said layers while said load-supporting device supports said pallet, said load-supporting device including a stop which establishes a predetermined location of said pallet with respect to said load-supporting device; and (e) said boom having a position of retraction automatically limited so as to align said clamp with said pallet to deposit said layers on said pallet when said pallet is in said predetermined location.

13. The clamp assembly of claim 12 wherein said clamp is telescopically extendable and retractable to both a right side and a left side of said truck.

14. The clamp assembly of claim 12, further comprising at least one pivot-stopping device that automatically stops lateral pivotal movement of said boom at a predetermined intermediate position within said 180° range.

15. The clamp assembly of claim 12 wherein said clamp has at least four clamp arms depending from said boom defining respective sides of a substantially rectangular opening.

16. A layer-picking clamp assembly supported by a truck, comprising:

(a) a first mounting apparatus positioned above a second mounting apparatus;

(b) a clamp supported on said first mounting apparatus;

(c) a load-supporting device supported on said second mounting apparatus;

(d) said first mounting apparatus movably supporting said clamp and including a power assembly substantially rigidly connected to said clamp to move said clamp horizontally and vertically with respect to said load-supporting device to enable said clamp to separately deposit individual layers of layered loads onto said load-supporting device;

(e) said load-supporting device being capable of supporting a pallet upon which said clamp can deposit said layers while said load-supporting device is beneath said pallet, said load-supporting device being insertable beneath said pallet by insertable movement of said load-supporting device toward said pallet;

(f) said load-supporting device including a stop which limits insertion of said load-supporting device beneath said pallet and thereby establishes a predetermined location of said pallet with respect to said load-supporting device.

17. The clamp assembly of claim 16 wherein said clamp is extendable and retractable horizontally with respect to said truck.

18. The clamp assembly of claim 17 including at least one automatic stopping device that stops horizontal retraction of said clamp automatically so as to align said clamp with said pallet to deposit said layers on said pallet when said pallet is in said predetermined location.

* * * * *